April 13, 1937.    W. F. A. BUEHNER    2,077,142
AUTOMOBILE LICENSE PLATE HOLDER
Filed July 29, 1936    2 Sheets—Sheet 1
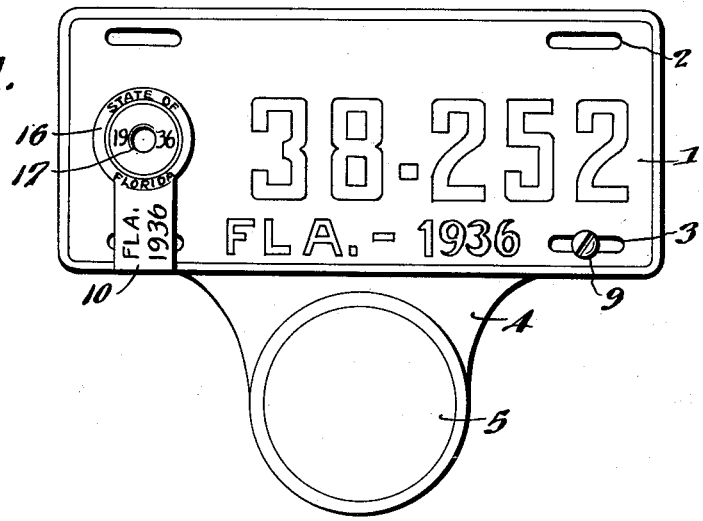
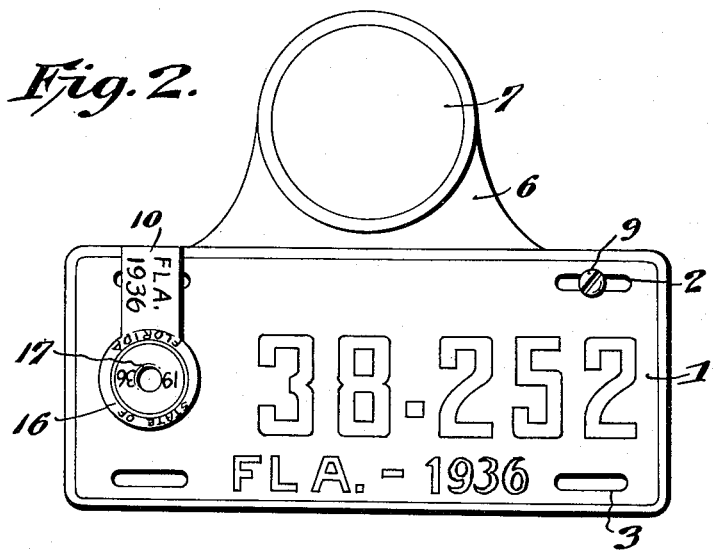
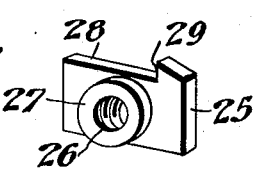
Inventor
William F. A. Buehner
By Lloyd W. Pateb
Attorney April 13, 1937.  W. F. A. BUEHNER  2,077,142
AUTOMOBILE LICENSE PLATE HOLDER
Filed July 29, 1936   2 Sheets-Sheet 2
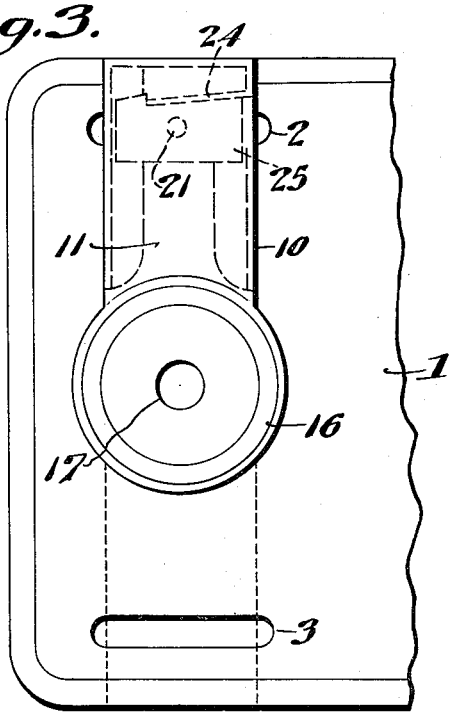
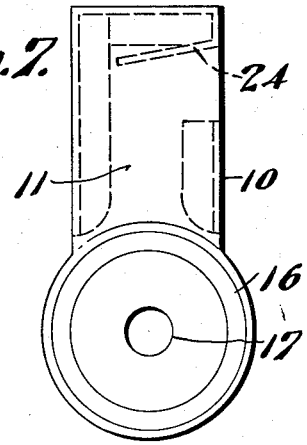
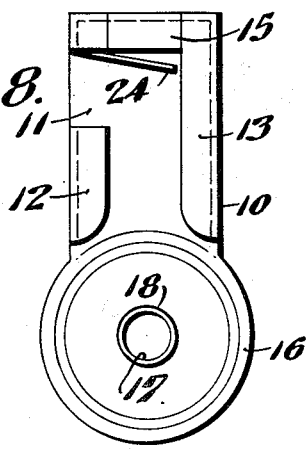
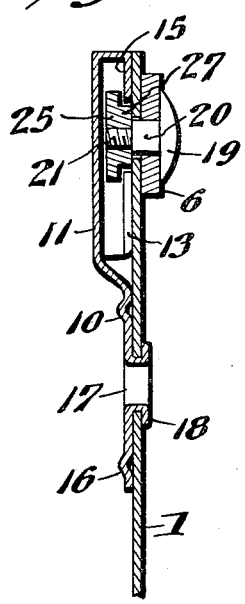
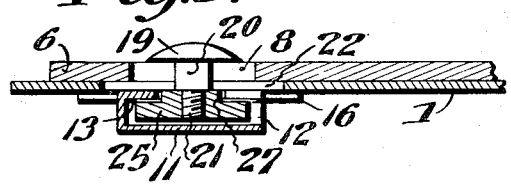
Inventor
William F. A. Buehner
By Lloyd W. Patch
Attorney

Patented Apr. 13, 1937

2,077,142

UNITED STATES PATENT OFFICE 2,077,142

AUTOMOBILE LICENSE PLATE HOLDER

William F. A. Buehner, Miami, Fla.

Application July 29, 1936, Serial No. 93,290

7 Claims. (Cl. 40—125)

My invention relates to automobile license plate holders, and particularly to a device of this character intended and adapted to prevent theft of license plates and use of the same upon an unauthorized automobile, or other unauthorized interchangement of license plates or tags from one machine to another.

The primary object of my invention is to provide a device of this character that can be readily used with and applied to license plates or tags as now ordinarily in use, and which will provide a double check to insure the display of plates or tags only upon the particular automobile or vehicle to which the license extends.

Another object is to so construct the device that an official seal is required, and mounting of the tag locks the tag in place so that any attempt to remove the license tag or plate will necessitate irreplaceable breaking or defacing of the official seal, to thus immediately give visible evidence of any tampering with or any attempted improper use of the plate or tag.

Yet another purpose is to provide a device of this character that is of simple and inexpensive construction to thus be readily and cheaply employed in connection with a license tag or plate, and which will positively guard against accidental or causal displacement and consequent loss of the plate or tag; and, which at the same time will discourage unauthorized tampering with or theft of the plates, and will positively preclude the possibility of use upon a vehicle other than that covered by the particular license.

A still further object and purpose of my present invention is to provide a license plate lock or holder in the form of a seal, which seal is riveted or otherwise permanently affixed to or associated with the plate or tag, and which is of such character that breaking of the seal or other tampering with the parts will be immediately and unmistakably indicated, the structure being such that once the seal has been broken it cannot be replaced without showing clearly visible signs of such breaking and thus making possible ready detection of any attempted unauthorized use.

With the above and other objects in view, which will be apparent to those skilled in the art, and which will appear from the following specification, my invention includes certain novel features of construction and combinations of parts which will be hereinafter described in connection with the drawings, and then pointed out in the claims.

In the drawings:

Figure 1 is a view in front elevation showing an automobile license tag with my invention applied thereto.

Fig. 2 is a view similar to Figure 1 illustrating another possible mounting and use of a tag embodying and including my invention.

Fig. 3 is an enlarged fragmentary view in elevation to better show the lock and seal means.

Fig. 4 is a vertical sectional view through the lock and seal means.

Fig. 5 is a fragmentary transverse sectional view.

Fig. 6 is a view in perspective showing the plate locking nut.

Fig. 7 is a view in front elevation illustrating the case of the lock structure.

Fig. 8 is a view similar to Fig. 7 illustrating the reverse side of the case.

My present invention is adaptable for use upon and in connection with license plates or tags as now ordinarily displayed upon the front or rear, or upon both front and rear of automobiles or other vehicles, and in other like connections. In Figs. 1 and 2, I have shown the license plate or tag 1 as being of ordinary size, shape and construction, and this tag can have numbers, words, letters, or other matter displayed thereon in any desired manner.

In some mountings of a license plate or tag the fastenings are fitted through the tag, and through a mounting bracket, the fastenings passing through the tag adjacent to its upper edge, and in other mountings the fastenings are passed through openings in the tag adjacent to its lower edge, the usual license tag being provided with a pair of slit-like openings 2 adjacent to its upper edge and similar openings 3 adjacent to its lower edge, which slit-like openings will ordinarily receive bolts or other fastenings by which the tag or plate is secured and mounted upon the mounting bracket 4 of the automobile. In the illustration in Figure 1, I have shown the mounting bracket 4 as extending upwardly from and above a tail light 5, and in the showing in Fig. 2, I have illustrated a common automobile construction in which the bracket 6 depends downwardly or extends below the tail light 7. Both of these arrangements are found upon automobiles as now in use, and where a front license plate or tag is required it will be found that the mounting bracket or plate on the front of a machine has in some instances the openings to receive the fastenings so placed that the fastenings must be fitted through the openings 2, while upon other automobiles or vehicles the bracket is of such construction that the fastenings must be placed through the openings 3 adjacent to the lower edge of the license tag or plate. In any form and mounting of bracket, it is customary to provide openings that will register with the pair of openings 2 or the pair of openings 3 so that the license bracket can have fastenings passed therethrough and through the openings of the license tag or plate, such an opening being shown at 8, in Figs. 4 and 5.

Ordinarily, two bolts or fastenings are employed to mount the license plate in place, to thus insure tight securement and hold the plate against loosening and consequent loss or rattling. With my present invention, an ordinary bolt, screw, or other fastening 9 can be used at one end of the plate and mounting bracket, and my improved lock structure is employed in connection with the fastening at the other end of the plate, inasmuch as securement of one end of the plate against removal is sufficient to lock and retain the plate in place.

A locking case 10 is provided with a front wall 11 having side wall portions 12 and 13 and an end wall portion extending rearwardly therefrom with the edges of the side and end wall portions bent to lie in spaced and substantially parallel relation with the front wall 11, thus providing a skeletonized rear wall portion, as at 15. The front portion 11 has a seal tab 16 extending from its end opposite to the end wall 14, and offset to lie in substantially the same plane with the skeletonized rear wall portion 15, this seal tab portion 16 being provided with a central opening 17 and having a sleeve 18 extending rearwardly therefrom to serve as a tubular rivet, in manner to be hereinafter more fully described.

A locking bolt 19 has a squared shoulder 20 thereon which will fit the opening 8 of the mounting and supporting bracket 4, to prevent rotation of this bolt 19, and the threaded shank or stem 21 of the bolt is adapted to be received through one of the openings 2 or 3 of the license plate 1, as the securement is accomplished from the upper or lower edge of the tag or plate.

In the manufacture of the license plate the numbers and other matter thereon will be preferably so located as to leave one end of the tag or plate between the openings 2 and 3 plain for mounting of the locking case, and the tag or plate has an opening 22 therethrough substantially centered between the openings 2 and 3 at one end of the plate 1. This opening 22 is of sufficient size to loosely receive the sleeve 18, and in the manufacture of the tag the sleeve 18 is headed over or riveted down to mount the locking member 10 permanently and irremovably upon the license plate or tag, and yet permit swinging movement to bring the case portion having the front wall 11 over either the upper opening 2 or the lower opening 3. The side wall 12 of the locking case member 10 has a portion thereof cut or severed to permit inward bending of a tongue-like portion which serves as a spring locking pawl 24, and at the same time the bending back of the tongue forming this pawl 24 leaves a lateral opening or clearance through the wall 12.

A locking nut 25, perhaps best illustrated in Fig. 6, is made of somewhat elongated form and is provided with a screw threaded opening 26 to receive the screw-threaded shank or stem 21 of the locking bolt 19. This locking nut 25 is turned onto the locking bolt 19 and is tightened down to clamp and secure the license plate or tag in place, an annular shoulder or boss portion 27 being provided to give clearance between the face of the license plate and the extending lateral portions of the body portion of the locking nut.

In the use of my improved lock structure, the plate having the case 10 permanently and swingably mounted thereon is supplied to the automobile owner by the proper authorities, associated with a locking bolt 19 and the locking nut 25, and the car owner can supply any desired fastening bolt or screw, as at 9. The locking case is of course assembled with the tag in such manner that removal of the case will require cutting of the riveting sleeve 18, or other destruction of the parts, and it will of course be appreciated that if the eyelet or rivet sleeve 18 be broken, cut, or otherwise severed, the casing 10 will not be permanently associated with the tag 1, and this casing cannot be tampered with without being destroyed or showing readily visible evidence of such tampering.

In the use of my improved structure the lock casing 10 will be swung to one side or the other to uncover either the opening 2, or the opening 3 immediately above or below the swinging mounting of the lock casing, accordingly as mounting of the tag or plate is to be accomplished at the upper edge or the lower edge thereof. The bolt 19 is fitted through the registering openings of the bracket 4 and the tag 1, and nut 25 is tightened in place with the boss 27 against the face of the tag, the nut being finally tightened to a position in which the notched face 28 is disposed away from the pivotal mounting of the locking case at 18. The fastening 9 is also inserted in place and is tightened or secured in any desired manner. Then, the locking case 10 is swung around its pivotal mounting to a position such that the locking nut 25 passes through the opening formed by bending back the locking tongue or pawl 24, and while the locking case has been swung to cover the locking nut 25, this tongue 24 will ride over and will engage back of the locking shoulder 29. As the pawl or tongue 24 is engaged at this shoulder 29 and the skeletonized rear wall portions 15 are received in the clearance provided back of the elongated head portion of the locking nut 25, which clearance is provided by the boss 27, the locking case is positively held against being swung to a nut releasing position and against being pried or being moved forwardly or outwardly to clear the locking nut 25. Thus, the locking case is permanently and rigidly secured and held upon the locking nut 25, and as the locking bolt 19 cannot be independently turned, the tag or plate 1 is securely locked and held against unauthorized removal.

Of course, when the license tag or plate is to be removed, this can be accomplished by cutting, breaking or otherwise severing the seal at 18, but once this seal has been broken it is impossible to reassemble the parts without showing signs of such removal, inasmuch as a bolt or other fastening placed through the opening 17 of the extension 16 will close this opening and will consequently readily visibly indicate that the device has been tampered with.

Of course, if desired, a solid rivet or plug can be placed through openings 17 of the locking case and 23 of the plate or tag, and this solid plug or rivet can be stamped or otherwise marked with a state seal, a state number, or any other official or particular identification or marking, perhaps somewhat after the manner of the seal and marking operations as now employed in railway car seals and in other connections. Such a rivet or plug or seal can be readily assembled to serve as a pivot to permit swinging movement of the casing 10, and if the plug or rivet or solid seal be broken, parts will be destroyed and any attempt at replacement with an unauthorized plug or rivet portion will be readily detected by reason of the omission of the official or special markings.

The forward side of the portions 11 and 16 of the locking case structure can have stamped, imprinted, or otherwise shown thereon, any numbers, dates, printing, pictures, or any other matter that may be desired, and this part can be numbered to correspond with the particular license tag, can have the year of the tag or plate and the state designation, and in fact can be marked in any way that will identify the genuine lock and will discourage attempts at counterfeiting or at repair or substitution, should the tag or plate, or the seal, be mutilated or defaced in any attempts at removal.

From the above it will be seen that I have provided an automobile license plate lock adaptable and suitable for association with and use upon license plates or tags as now ordinarily used, and which will provide for state, municipal, or other governmental bodies, a means and method of conveniently and readily assuring that license plates issued to an individual for use only upon a particular machine will be thus installed only in such authorized use. Further, it will be appreciated that such locking means can be readily associated and used with tags or license plates of present conventional form, type and style, and that the direct association of the locking means with the plate as issued to the individual constitutes a convenient and accurate assembly for issuance, handling and installation.

While I have herein shown and described only certain specific embodiments of my invention and have set forth only certain possible installations and use, it will be understood that changes and variations can be made in the form, construction, arrangement, assembly, and association of the parts, and in the manner of use, without departing from the spirit and scope of my invention.

I claim:

1. In combination with a license plate having an opening and a mounting bracket therefor also having an opening, a mounting bolt fitted through the openings of the bracket and plate, a locking nut fitted on said locking bolt and provided with a guideway portion, a locking housing swingably carried by said plate and swingable to a position to cover said locking nut, and means carried by said locking housing engageable with said locking nut and in the guideway portions thereof to hold and retain said locking case in position over said locking nut to prevent removal of said locking nut from the locking bolt.

2. In combination with a license plate having an opening and a mounting bracket therefor also having an opening, a mounting bolt fitted through the openings of the bracket and plate, a clamp nut fitted on said mounting bolt to secure the plate in conjunction with the mounting bracket, a locking housing swingably mounted on the body of the plate and swingable to a position to cover said clamp nut, and means carried by said locking housing to lock said housing against return movement and against undetectable removal from its position of covering the locking nut.

3. In combination with a license plate having fastening receiving openings adjacent to its upper and its lower edges and a mounting bracket provided with fastening receiving openings, said plate being adapted to be placed and mounted upon said bracket with the mounting opening thereof most conveniently accessible aligned with the mounting opening of the bracket, a mounting bolt fitted through the aligned openings, a clamp nut fitted on said mounting bolt to bear against the face of the plate and hold said plate in place, a locking housing swingably and permanently mounted on the face of said plate intermediate the mounting openings thereof and swingable to a position to cover over the clamp nut, and means to lock and hold said lock housing in the clamp nut covering position.

4. In combination, a bracket having a fastening receiving opening, a license plate provided with fastening openings adjacent to its upper and its lower edges to be selectively aligned with the opening of the bracket as may be most convenient for mounting and display of said plate, a bolt fitted through the aligned openings of the bracket and plate, a nut on said bolt, a lock housing swingably mounted on said plate intermediate the openings thereof and having a portion to receive and enclose the nut, and pawl means to hold said locking housing against return swinging movement to expose the nut.

5. In combination, a bracket having a fastening receiving opening, a license plate provided with a fastening receiving opening aligned with the opening of the bracket, a bolt fitted through the openings of the bracket and plate, a nut on said bolt having a notched locking face, and a locking housing permanently swingably mounted on said plate to be swung to a position to cover said nut and provided with means engaging in the notch of the nut to hold said housing against swinging movement to uncover said nut.

6. In combination, a mounting bracket having a bolt receiving opening therethrough, a bolt fitted through said opening, a license plate having an opening through which the bolt fits, a clamp nut turned onto said bolt and provided with a head-like portion spaced from the plate, a locking housing permanently swingably mounted on said plate and movable to a position to cover said locking nut, said housing being provided with portions engaging back of the head-like portion of the nut to hold said housing against separation from proximity to the face of the plate, and means to hold said locking housing against swinging movement from the position over the nut.

7. In combination, a mounting bracket having a bolt receiving opening therethrough, a license plate having bolt receiving openings adjacent to the top and bottom openings thereof one of which will be registered with the bolt receiving opening of the mounting bracket, a bolt fitted through the registering openings, a clamp nut fitted on said bolt to hold the plate in place, said nut being provided with a notched locking face on one side edge and having a head-like portion separated from the face of the plate, a locking housing permanently swingably secured on the face of the plate intermediate the bolt receiving openings thereof to be swung to cover the clamp nut tightened upon a bolt through the opening at the top and at the bottom of the plate as the particular mounting may be, said locking housing being provided with portions to engage back of the head-like formation of the nut to hold said housing against separation from the forward side of the plate, and a pawl carried internally by said locking housing to engage in the notched locking face of the nut to lock said housing over the nut and prevent swinging movement of the housing to give access to remove said nut.

WILLIAM F. A. BUEHNER.